United States Patent
Choi et al.

(10) Patent No.: US 9,376,084 B2
(45) Date of Patent: Jun. 28, 2016

(54) MULTI-CHAMBER AIRBAGS

(71) Applicant: Autoliv ASP, Inc., Ogden, UT (US)

(72) Inventors: ChangSoo Choi, Rochester, MI (US); David W. Schneider, Waterford, MI (US); Hylus Ranjit Raj Jayakar, Auburn Hills, MI (US); Harry H. Park, Bloomfield Hills, MI (US); Christina R. Morris, Auburn Hills, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/099,928

(22) Filed: Dec. 7, 2013

(65) Prior Publication Data

US 2015/0158452 A1    Jun. 11, 2015

(51) Int. Cl.
*B60R 21/233* (2006.01)
*B60R 21/231* (2011.01)
*B60R 21/00* (2006.01)

(52) U.S. Cl.
CPC ............. *B60R 21/233* (2013.01); *B60R 21/231* (2013.01); *B60R 2021/0004* (2013.01); *B60R 2021/23308* (2013.01); *B60R 2021/23332* (2013.01)

(58) Field of Classification Search
CPC  B60R 21/205; B60R 21/233; B60R 21/2342; B60R 2021/23308; B60R 2021/23324
USPC ......................................................... 280/729
See application file for complete search history.

(56) References Cited

U.S. PATENT DOCUMENTS

| | | | |
|---|---|---|---|
| 3,614,129 A * | 10/1971 | Sobkow | 280/730.1 |
| 3,642,303 A * | 2/1972 | Irish et al. | 280/730.1 |
| 3,768,830 A * | 10/1973 | Hass | 280/729 |
| 3,801,126 A | 4/1974 | Knight, IV et al. | |
| 4,043,572 A | 8/1977 | Hattori et al. | |
| 4,262,931 A * | 4/1981 | Strasser et al. | 280/729 |
| 5,556,128 A | 9/1996 | Sinnhuber | |
| 5,575,497 A | 11/1996 | Suyama | |
| 5,586,782 A | 12/1996 | Zimmerman, II | |
| 5,609,363 A * | 3/1997 | Finelli | B60R 21/231 280/730.1 |
| 5,791,685 A * | 8/1998 | Lachat et al. | 280/743.1 |

(Continued)

FOREIGN PATENT DOCUMENTS

| | | |
|---|---|---|
| DE | 10146493 A1 | 4/2003 |
| DE | 102010019592 A1 | 11/2011 |

(Continued)

OTHER PUBLICATIONS

International Search Report and Written Opinion for PCT/US2014/067283 mailed Feb. 20, 2015.

(Continued)

*Primary Examiner* — Paul N Dickson
*Assistant Examiner* — Timothy Wilhelm
(74) *Attorney, Agent, or Firm* — Stoel Rives LLP

(57) ABSTRACT

An airbag can include a first cushion portion that defines a first inflatable chamber and a second cushion portion that is connected to the first cushion portion and defines a second inflatable chamber. The first inflatable chamber can receive inflation gas from an inflator to expand the first cushion portion and the second cushion portion can receive inflation gas from the first inflatable chamber to expand the second cushion portion. In some arrangements, a temporary fastener may maintain the second cushion portion in a compact state during expansion of the first cushion portion.

14 Claims, 13 Drawing Sheets

(56) References Cited

U.S. PATENT DOCUMENTS

| | | | |
|---|---|---|---|
| 5,803,485 | A | 9/1998 | Acker |
| 5,853,191 | A * | 12/1998 | Lachat ................ 280/730.2 |
| 5,945,184 | A | 8/1999 | Nagata |
| 6,123,355 | A | 9/2000 | Sutherland |
| 6,126,196 | A | 10/2000 | Zimmerman |
| 6,135,493 | A | 10/2000 | Jost et al. |
| 6,139,052 | A | 10/2000 | Preamprasitchai |
| 6,158,765 | A * | 12/2000 | Sinnhuber ............ 280/728.3 |
| 6,196,575 | B1 * | 3/2001 | Ellerbrok et al. ........ 280/729 |
| 6,247,727 | B1 * | 6/2001 | Hamada et al. ........ 280/743.2 |
| 6,254,121 | B1 * | 7/2001 | Fowler et al. .......... 280/729 |
| 6,308,983 | B1 * | 10/2001 | Sinnhuber ............ 280/735 |
| 6,419,262 | B1 | 7/2002 | Fendt et al. |
| 6,431,586 | B1 | 8/2002 | Eyrainer et al. |
| 6,648,371 | B2 | 11/2003 | Vendely |
| 6,786,505 | B2 * | 9/2004 | Yoshida ............ 280/729 |
| 6,971,664 | B2 * | 12/2005 | Amamori ............ 280/729 |
| 7,040,650 | B2 | 5/2006 | Neupert et al. |
| 7,261,320 | B2 | 8/2007 | Fredin et al. |
| 7,347,450 | B2 | 3/2008 | Williams et al. |
| 7,571,929 | B2 | 8/2009 | Fukawatase et al. |
| 7,726,685 | B2 | 6/2010 | Abe et al. |
| 7,850,200 | B2 | 12/2010 | Zauritz et al. |
| 7,938,445 | B2 | 5/2011 | Smith et al. |
| 7,942,443 | B2 * | 5/2011 | Dennis et al. ........ 280/743.2 |
| 7,988,188 | B2 | 8/2011 | Zauritz et al. |
| 8,038,169 | B2 * | 10/2011 | Rick ........ B60R 21/206 280/732 |
| 8,186,713 | B2 | 5/2012 | Fischer et al. |
| 8,215,665 | B2 | 7/2012 | Ohara et al. |
| 8,596,678 | B2 | 12/2013 | Ravenberg et al. |
| 2003/0094794 | A1 | 5/2003 | Amamori |
| 2003/0193174 | A1 | 10/2003 | Abe |
| 2003/0209895 | A1 | 11/2003 | Gu |
| 2003/0218325 | A1 | 11/2003 | Hasebe et al. |
| 2004/0046369 | A1 | 3/2004 | Michael et al. |
| 2004/0090054 | A1 | 5/2004 | Bossecker et al. |
| 2004/0145161 | A1 | 7/2004 | Hasebe et al. |
| 2005/0029781 | A1 | 2/2005 | Enders et al. |
| 2005/0104339 | A1 | 5/2005 | Hasebe et al. |
| 2005/0110249 | A1 | 5/2005 | Hasebe |
| 2005/0184489 | A1 | 8/2005 | Kobayashi |
| 2005/0269808 | A1 | 12/2005 | Song et al. |
| 2006/0006631 | A1 | 1/2006 | Meissner et al. |
| 2006/0175809 | A1 | 8/2006 | Yamaji et al. |
| 2006/0197324 | A1 | 9/2006 | Klinkenberger |
| 2006/0232050 | A1 | 10/2006 | Kumagai et al. |
| 2006/0284400 | A1 | 12/2006 | Sakakibara et al. |
| 2006/0290111 | A1 | 12/2006 | Kokeguchi |
| 2007/0126217 | A1 | 6/2007 | Nayef |
| 2007/0170710 | A1 | 7/2007 | Bouquier |
| 2007/0210565 | A1 | 9/2007 | Song et al. |
| 2008/0048420 | A1 * | 2/2008 | Washino ............ 280/731 |
| 2008/0054602 | A1 | 3/2008 | Yang |
| 2008/0073893 | A1 | 3/2008 | Schneider |
| 2008/0100041 | A1 | 5/2008 | Kim et al. |
| 2008/0143086 | A1 | 6/2008 | Higuchi |
| 2008/0179867 | A1 | 7/2008 | Riedel et al. |
| 2008/0308338 | A1 * | 12/2008 | Kitte et al. ............ 180/271 |
| 2009/0020987 | A1 | 1/2009 | Wipasuramonton |
| 2009/0026743 | A1 | 1/2009 | Arez |
| 2009/0121462 | A1 | 5/2009 | Rick |
| 2009/0189374 | A1 | 7/2009 | Fukawatase |
| 2010/0066064 | A1 | 3/2010 | Kotikovsky |
| 2010/0252350 | A1 * | 10/2010 | Hayashi et al. ........ 180/274 |
| 2011/0101660 | A1 * | 5/2011 | Schneider et al. ........ 280/731 |
| 2011/0140398 | A1 * | 6/2011 | Song et al. ............ 280/729 |
| 2012/0025497 | A1 | 2/2012 | Yoo |
| 2012/0200069 | A1 | 8/2012 | Kato et al. |
| 2012/0223550 | A1 | 9/2012 | Mazanek |
| 2013/0001935 | A1 | 1/2013 | Nagasawa et al. |
| 2013/0087995 | A1 | 4/2013 | Lee et al. |
| 2014/0265271 | A1 | 9/2014 | Dinsdale et al. |
| 2014/0375032 | A1 | 12/2014 | Fukawatase et al. |

FOREIGN PATENT DOCUMENTS

| | | |
|---|---|---|
| DE | 102012019581 A1 | 4/2012 |
| EP | 2617607 A1 | 7/2013 |
| JP | 06024283 | 2/1994 |

OTHER PUBLICATIONS

International Search Report and Written Opinion for PCT/US2015/029615 mailed Sep. 23, 2015.

Office Action mailed Sep. 4, 2015, in U.S. Appl. No. 14/258,853, filed Apr. 22, 2014.

Office Action mailed Jun. 25, 2015, in U.S. Appl. No. 14/294,405, filed Jun. 3, 2014.

International Search Report and Written Opinion for PCT/US2015/019716 mailed Jun. 3, 2015.

Office Action mailed Aug. 4, 2015, in U.S. Appl. No. 14/512,025, filed Oct. 10, 2014.

Office Action mailed Jan. 9, 2015, in U.S. Appl. No. 14/294,405, filed Jun. 3, 2014.

Restriction Requirement mailed May 12, 2015, in U.S. Appl. No. 14/512,025, filed Oct. 10, 2014.

* cited by examiner

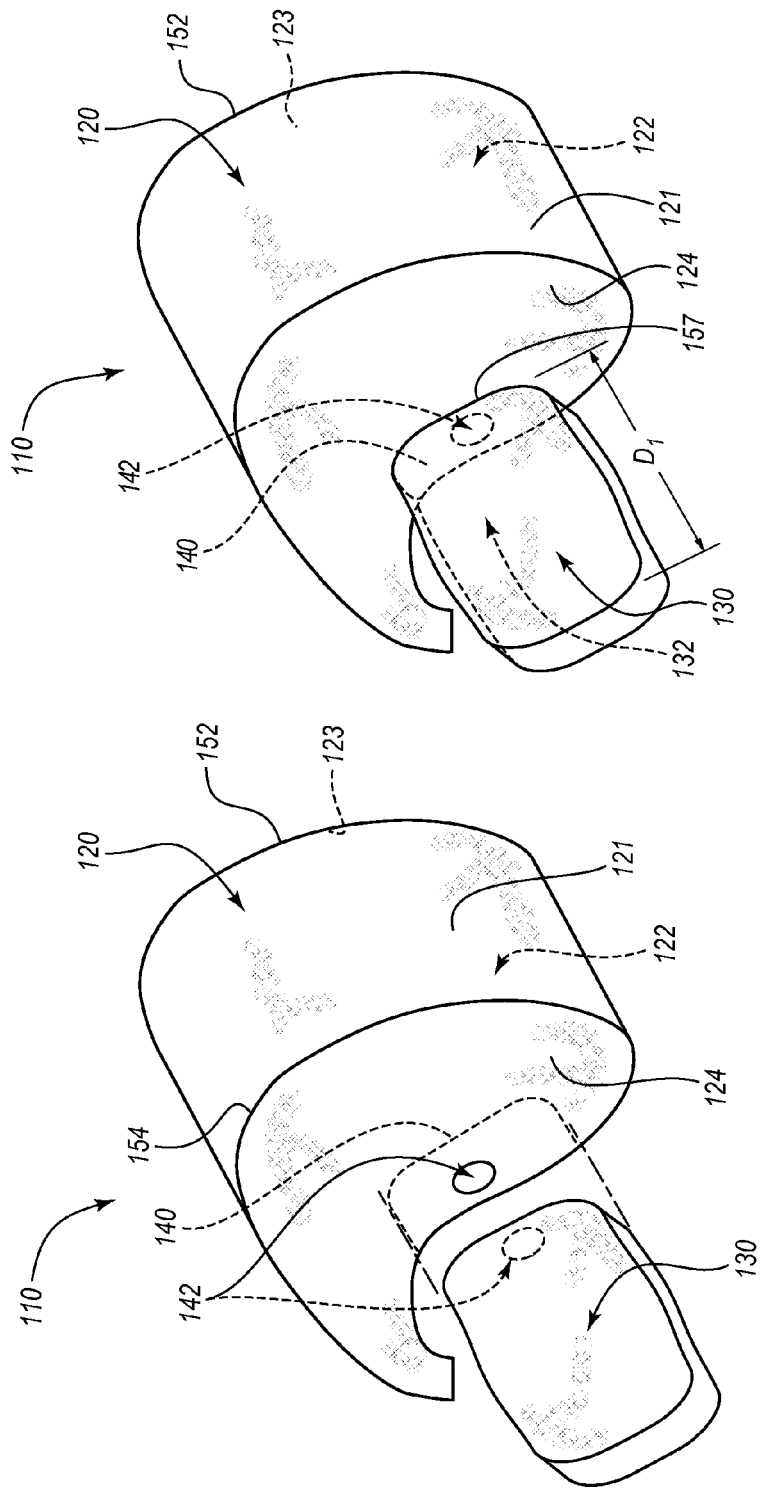

MULTI-CHAMBER AIRBAGS

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 4A is an exploded perspective view of an airbag portion of the airbag assembly of FIG. 1 that is shown in an expanded state, wherein a vent that provides fluid communication between a pair of inflatable chambers is shown;

FIG. 4B is a perspective view of the airbag of FIG. 4A in an assembled state;

DETAILED DESCRIPTION

Figure 1:
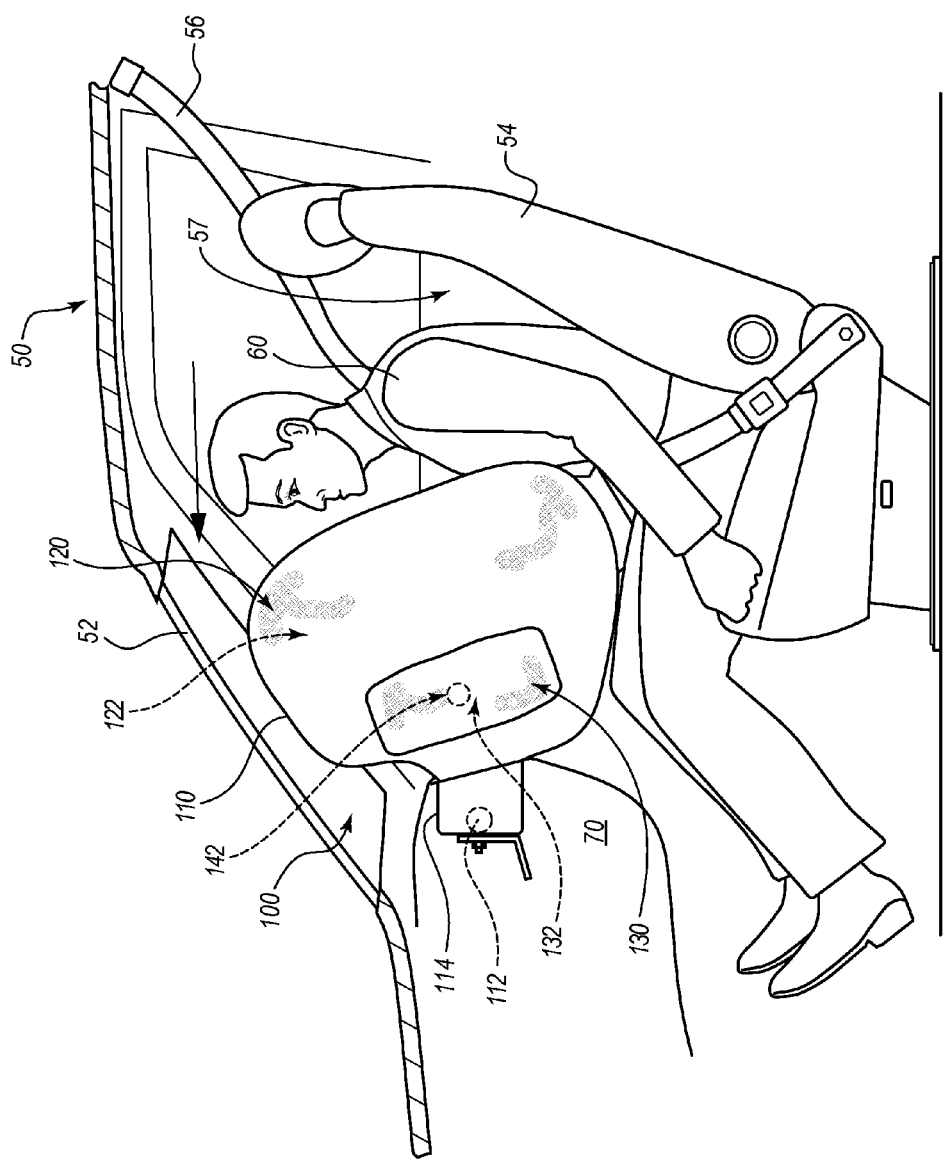
FIG. 1 is a side elevation view of an embodiment of an airbag assembly in a deployed state within a vehicle, wherein an occupant seated in a front passenger seat of the vehicle is depicted moving toward the deployed airbag assembly.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury during a collision event. Airbag modules have been installed at various locations within a vehicle, including, but not limited to, the steering wheel, the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" or "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for use as passenger airbags, and may be mounted in a dashboard. In some embodiments, an airbag assembly includes an airbag comprising multiple portions (e.g., regions, sections, or pieces) that are configured to cushion an occupant during a collision event. A first or primary cushion portion can be configured to deploy primarily toward a vehicle occupant position (e.g., the position typically occupied by a passenger). This cushion portion may be configured to receive the torso and/or the head of a passenger in a frontal collision event. A second cushion portion, which may also be referred to as a supplemental cushion portion, may be configured to deploy primarily in a different direction, such as, for example, in an inboard direction. For example, the second cushion portion may be configured to deploy primarily in a direction that is lateral, transverse, or perpendicular to the direction in which the first cushion portion is deployed. The second cushion portion may be particularly suited for cushioning the head of a vehicle occupant when the occupant moves in an oblique direction.

Airbags that have multiple cushion portions may provide increased protection to a passenger, as compared with certain airbags that have only a single inflatable portion. For example, in some embodiments, the first cushion portion may be configured to receive a vehicle occupant in a frontal collision event that causes the vehicle occupant to move primarily directly forward, as previously stated. The second cushion portion may be configured to stabilize the first cushion portion relative to the dashboard and/or receive the passenger when the vehicle is involved in a collision that causes the vehicle occupant to move in both a forward and inboard direction. For example, in some instances a single-chamber airbag may be too narrow to provide effective coverage for a vehicle occupant who has a forward and inboard trajectory (which may also be referred to as an angled trajectory). In some instances, a vehicle occupant may slide off of the single-chamber airbag cushion during loading of the airbag when the occupant has a forward and inboard trajectory, or the occupant may entirely fail to engage with the cushion. An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is travelling in a direction that is not substantially parallel to the other vehicle's direction of travel; co-linear vehicle-to-vehicle collisions, such as collisions where, immediately prior to impact, both vehicles are travelling in substantially parallel directions; or collisions with a stationary object.

Some embodiments disclosed herein can provide improved positioning, cushioning, and/or safety to occupants involved in particular types of collisions. For examples, some embodiments can be particularly suited to cushion front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the of the vehicle width, (5) collisions as specified for the Insurance Institute for Highway Safety (IIHS) small overlap frontal crash test, or (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version II)*, (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012).

In some embodiments, the first cushion portion is configured to inflate prior to inflation of a second cushion portion. For example, during a deployment event, an inflator may fill a first cushion portion with gas until the pressure within the airbag causes a temporary fastener to release the second cushion portion for deployment. In some embodiments, a first cushion portion may deploy or begin deployment before the second cushion portion begins to be deployed. The second cushion portion can be configured to receive gas via a vent that fluidly couples the first and second cushion portions. Advantages of various embodiments will be evident from the present disclosure.

FIG. 1 is an elevation view of an instrument panel 70 and an airbag assembly 100 within a vehicle 50. The instrument panel 70 may also be referred to herein as a dashboard. In many vehicles 50, a central region of the instrument panel can include a stack of various buttons, controls, and other user interfaces. For example, the central region, which may commonly be referred to as a center stack or as an IP stack 71 (see FIG. 2), can include one or more of a screen (such as for navigation, backup camera display, etc.), radio and/or other media controls, climate controls, etc. The airbag assembly 100 is depicted in a deployed and inflated configuration. A vehicle occupant 60 is shown seated in a front passenger seat 54 of a vehicle. When the airbag assembly 100 is not deployed, the airbag assembly 100 may be positioned within the instrument panel 70. As shown in FIG. 1, an occupant restraint system can include the airbag assembly 100 and any other suitable restraint devices, such as a safety belt 56.

The airbag assembly 100 can include an inflatable airbag cushion 110 (which may also be referred to as an airbag), an inflator 112, and an airbag housing 114. The airbag housing 114 may be of any suitable variety, and may include a cover (not shown), behind which the airbag cushion 110 is located. The cover may be of any suitable variety, and may include a tear seam or burst seam through which the airbag cushion 110 may deploy. The housing 114 can be mounted within the dashboard 70 in any suitable manner.

The airbag 110 may be manufactured in any suitable manner, such as via one piece weaving, "cut and sew" techniques, or a combination thereof. In some embodiments, separate panels may be joined together using sealed or unsealed seams, wherein the seams are formed by stitching, adhesive, taping, radio frequency welding, heat sealing, and/or any other suitable technique or combination of techniques.

In the illustrated embodiment, the inflatable airbag cushion 110 includes a first, or primary, cushion portion 120 connected to a second, or supplemental, cushion portion 130. The first cushion portion 120 can comprise any suitable shape. For example, in some embodiments, the first cushion portion 120 comprises any suitable passenger airbag configuration. In some embodiments, the first cushion portion 120 is formed of any suitable arrangement of panels. The panels may comprise separate pieces of material that are joined along seams or may be formed of a unitary piece of material, for example. For example, the first cushion portion 120 may include a side panel adjacent to a side door of the vehicle, an oppositely positioned side panel facing the interior of the vehicle, and one or more panels that connect the side panels to each other to at least substantially enclose a first inflatable chamber 122. The first cushion portion 120 may also be referred to as a primary cushion, a primary cushion portion, or as a primary chamber.

The second cushion portion 130 can define a smaller volume than the first cushion portion 120, and may also be referred to as a secondary cushion or as a supplemental chamber. The second cushion portion 130 can comprise any suitable shape and configuration, and may be formed in any suitable manner. For example, the second cushion portion 130 may likewise comprise a plurality of panels that are joined together along their edges. The panels may be formed of separate pieces of material or from a single piece of material.

The second cushion portion 130 can be joined to the first cushion portion 120 in any suitable manner, such as via one or more seams. In some embodiments, a seam (such as a perimeter seam) that is used to join a side panel of the first cushion portion 120 to other panels of the first cushion portion 120 may also be used to join the second cushion portion 130 to the first cushion portion 130. For example, the second cushion portion 130 can be attached to the first cushion portion 120 by a perimeter seam (e.g., a perimeter stitch). In other embodiments, one or more seams that are separate from the perimeter seam may be used to join the first and second cushion portions 120, 130. For example, in some embodiments, a periphery of the second cushion portion 130 may be secured to a side panel of the first cushion portion 120 via stitching at a position internal to the periphery of the first cushion portion 120. In still other embodiments, the first and second cushion portions 120, 130 may be formed of a unitary piece of material.

As previously mentioned, the first and second cushion portions 120, 130 can be in fluid communication with each other. The fluid communication may be provided by a vent 142 that can permit inflation gases to pass freely between the first and second cushion portions 120, 130. In the illustrated embodiment, the vent 142 is formed in a side panel of the first cushion portion 120. More particularly, the vent 142 may be positioned directly between the first and second inflatable chambers 122, 132, and thus may provide direct fluid communication between these chambers.

When the airbag cushion 110 is fully deployed, the first cushion portion 120 can be positioned directly in front of the occupant 60 and the second cushion portion 130 can extend laterally, in an inboard direction, from the first cushion portion 120. For example, in some embodiments, the second cushion portion 130 may be configured to cover the IP stack region 71 (see FIG. 2) of the dashboard 70. The first cushion portion 120 may be connected to the second cushion portion 130 in any suitable manner, such as via one or more seams (e.g., one or more lines of stitching, welds, and/or adhesives).

In the illustrated embodiment, the first cushion portion 120 defines a first inflatable chamber 122 that is configured to receive inflation gas from the inflator 112. The first cushion portion 120 can thereby expand from a compact state to a deployed state. The second cushion portion 130 defines a second inflatable chamber 132 that is configured to receive inflation gas from the first inflatable chamber 122. Stated otherwise, the second cushion portion 130 may be in fluid communication with the first cushion portion 120 so that the second inflatable chamber 132 receives inflation gas directly from the first inflatable chamber 122 via the vent 142. The second inflatable chamber 132 may be said to receive inflation gas indirectly from the inflator 112 via the first inflatable chamber 122. The second cushion portion 130 can thereby expand from a compact state to a deployed state.

FIG. 1 illustrates the airbag assembly 100 deployed to receive the vehicle occupant 60. The occupant 60 is shown seated in a seat 54 configured to fit a single person (e.g., a bucket seat). The seat 54 may provide a well-defined vehicle occupant region 57, which may also be referred to herein as a vehicle occupant position, within which the vehicle occupant 60 is generally positioned while in the seat 54. As previously mentioned, the first cushion portion 120 can be configured to deploy directly in front of the vehicle occupant region 57 and/or toward the vehicle occupant region 57. Stated otherwise, in some instances, the first cushion portion 120 may follow a trajectory that is not in a straight line toward the vehicle occupant region 57, such as by expanding upwardly toward a windshield 52 of the vehicle 50 and/or downwardly toward a floor of the vehicle 50. However, a general deployment of the first cushion portion 120 may nevertheless be generally rearward toward the vehicle occupant region 57.

In operation, the airbag assembly 100 can be deployed when the vehicle 50 is involved in a collision. As discussed in greater detail below, the first cushion portion 120 of the airbag 110 can be configured to deploy prior to deployment of the second cushion portion 130. The first cushion portion 120 can deploy in a direction toward the vehicle occupant 60 in any suitable manner. For example, the first cushion portion 120 can deploy generally as a passenger airbag that does not include a supplemental chamber might deploy. In the illustrated embodiment, the second cushion portion 130 receives inflation gas from a first cushion portion 120 to extend from the first cushion portion 120 toward the driver's side of the vehicle.

In some instances, when the vehicle 50 is involved in a collision that causes the occupant 60 to move primarily or substantially exclusively in a forward direction toward the dashboard 70, the first cushion portion 120 may receive the vehicle occupant 60 in a typical fashion. In certain of such instances, the second cushion portion 130 may act as a pressure release region into which inflation gases can be vented through the vent 142 during ride down of the occupant 60. In other instances, the vehicle 50 can be involved in a collision that causes the occupant 60 to move in both the forward direction and an inboard direction (e.g., toward the center of the vehicle or toward the driver side of the vehicle). The second cushion portion 130 can provide an additional cushioning region for the occupant 60 in such instances. For example, in some circumstances, the occupant 60 may miss the first cushion portion 120 but may be received by the second cushion portion 130. In other or further circumstances, the first cushion portion 120 may roll as the occupant 60 engages an inboard corner thereof such that the occupant 60 does not fully engage the first cushion portion 120 and may then be received by the second cushion portion 130. In still other or further circumstances, the second cushion portion 130 may stabilize the first cushion portion 120 to make the first cushion portion 120 resistant to rolling or otherwise missing the occupant 60 as the occupant 60 travels in an angled forward/inboard direction.

Figure 2:
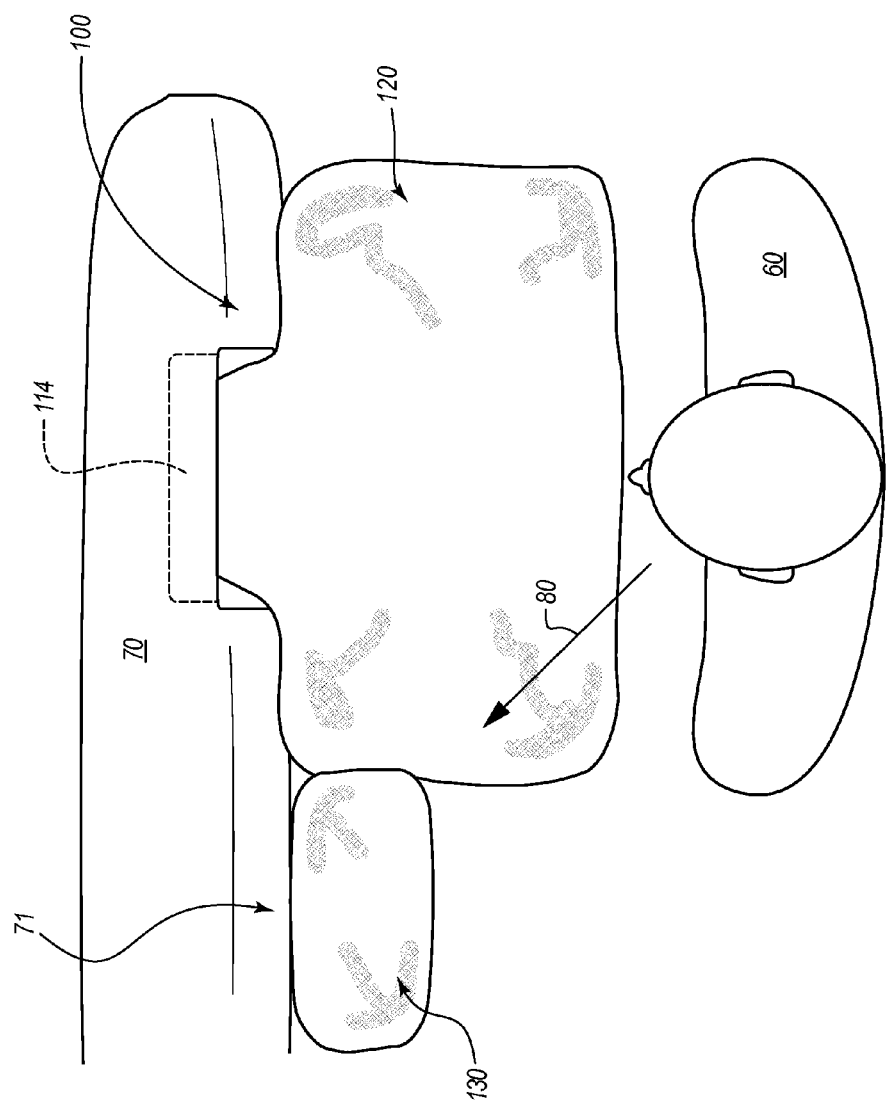
FIG. 2 is a top plan view of the airbag assembly of FIG. 1 deployed in a different collision event, wherein the vehicle occupant is depicted moving in a different direction relative to the airbag assembly.

FIG. 2 depicts the airbag system 100 in a deployed state due to a collision event that causes the torso of the occupant 60 to travel in an angled forward/inboard direction such as that just described. The angled direction, which may also be referred to as an oblique direction, is depicted by the arrow 80. In the illustrated embodiment, the first cushion portion 120 deploys from the instrument panel 70 in a first direction toward an occupant seated in front of the airbag housing 114. In this manner, the first cushion portion 120 is prepared to receive the occupant 60, and would do so in a typical fashion if the vehicle occupant 60 were to move primarily in a forward direction (i.e., toward the front of the vehicle), such as depicted in FIG. 1. However, the angled movement of the occupant 60 may prevent the occupant from adequately engaging with the first cushion portion 120.

As shown in FIG. 2, the deployed second cushion portion 130 extends laterally from a first cushion portion 120 toward the driver's side of a vehicle 50. A front face of the second cushion portion 130 can be positioned adjacent to the dashboard 70 when the second cushion portion 130 is inflated. Such an orientation of the second cushion portion 130 can assist in stabilizing the first cushion portion 120. In other or further arrangements, such an orientation can permit the second cushion portion 130 to readily receive the occupant 60 if the occupant bypasses or is not fully stopped by the first cushion portion 120. The second cushion portion 130 may thus shield the occupant 60 from harmful contact with the dashboard 70, and in some instances, may be oriented in such a manner to shield the occupant 60 from harmful contact with the IP stack region 71 of the dashboard. In the illustrated embodiment, the IP stack region 71 is illustrated as being substantially flush with adjacent outboard portions of the dashboard 70. Similarly, the rear face of the second cushion portion 130 may be substantially flush with the IP stack region 71 of the dashboard. In other embodiments, the IP stack region 71 may project rearwardly within the cabin of the vehicle. In certain of such embodiments, the rear face of the second cushion portion 130 may be positioned rearwardly (e.g., toward a rearward end of the vehicle) relative to a rear face of the first cushion portion 120.

The deployed second cushion portion 130 can receive the vehicle occupant 60 if the occupant misses the first cushion portion 120. In other or further circumstances, the first cushion portion 120 may roll as the occupant 60 engages an inboard corner thereof such that the occupant 60 does not fully engage the first cushion portion 120 and may then be received by the second cushion portion 130. In still other or further circumstances, the second cushion portion 130 may stabilize the first cushion portion 120 to make the first cushion portion 120 resistant to rolling or otherwise missing the occupant 60 as the occupant 60 travels in an angled forward/inboard direction.

Figure 3:
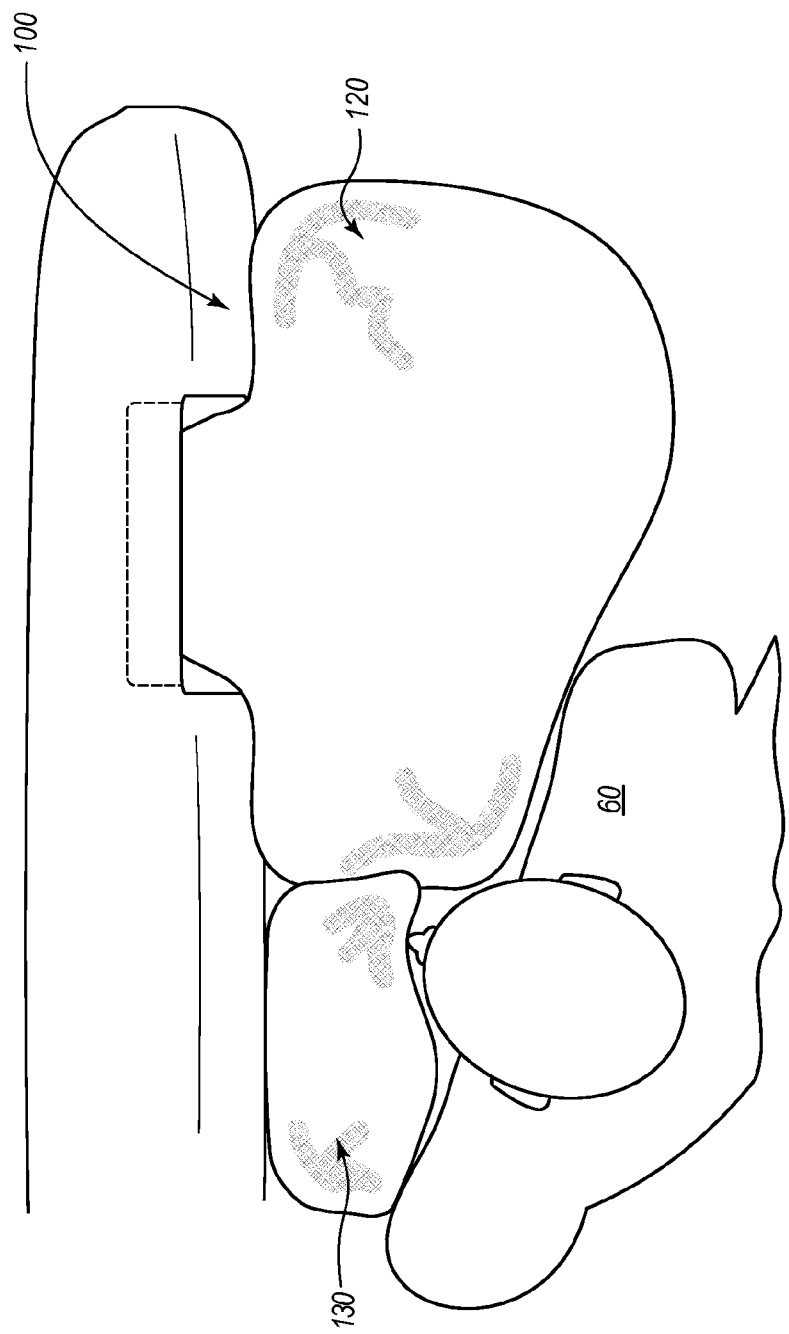
FIG. 3 is a top plan view of the airbag assembly of FIG. 1 that depicts a subsequent position of the vehicle occupant, as compared to FIG. 2, wherein a multi-chambered airbag cushions the vehicle occupant.

FIG. 3 depicts the vehicle occupant 60 at a later stage of interaction with the deployed airbag assembly 100. In the illustrated embodiment, the torso of the occupant 60 that has only partially engaged with the first cushion portion 120, while another portion of the torso has either deflected off of or bypassed the first cushion portion 120 to engage the second cushion portion 130, due to the occupant's movement in the oblique direction 80 (i.e., oblique relative to the forward direction). The head of the occupant 60 is also shown being received by the second cushion portion 130. In some instances, when the occupant 60 contacts an inboard region of the first cushion portion 120, it may cause the head of the occupant 60 to rotate in an outboard direction (e.g., toward the passenger door). The second cushion portion 130 may reduce or prevent such rotational movement, which might otherwise result in or contribute to kinematic rotational brain injury. In some instances, an effectiveness of the airbag cushion 110 at reducing such brain injury can be sensitive to a position at which the head of the occupant originally contacts the airbag cushion 110. The configuration of the second cushion portion 130 may be determined in view of this relationship, in some instances.

In some collision scenarios, the shoulder restraint portion of the seatbelt 56 (see FIG. 1) may slip off of the shoulder (e.g., the right shoulder) of the occupant 60 due to the oblique movement of the occupant. With little or no restraint provided by the seatbelt 56 to inhibit movement of the torso of the occupant 60 along an oblique trajectory, it may be particularly desirable for the airbag cushion 110 to be configured to cushion the occupant, or the portion thereof, that bypasses the first cushion portion 120 to prevent hard contact of the occupant 60 with the instrument panel.

In the illustrated embodiment, the head and left shoulder of the occupant 60 are protected from harmful contact with the dashboard 70 by the second cushion portion 130. In other instances, the secondary cushion 130 may protect other body portions of the occupant due to the nature of the collision; the size, shape, and/or initial position of the occupant; the configuration of the second cushion portion 130; etc. In some embodiments, the second cushion portion 130 is configured to primarily cushion the head of the vehicle occupant. In some instances, inflation gas may be forced from the second inflatable chamber 132 into the first inflatable chamber 122 through the vent 142 as the second cushion portion 130 cushions the head of the occupant 60.

In some embodiments, it may be desirable for the head of the occupant 60 to "pocket" within the second cushion portion 130. For example, in the illustrated embodiment, the head is shown within a depression of the second cushion portion 130, which may also be referred to as a pocket. Such an arrangement may stabilize the head during ridedown and/or may reduce rotational velocities of the head. Such a reduction in rotational velocities of the head may advantageously reduce the risk of brain injury.

The size, shape, or any other configuration of the vent 142 may be selected to control a pressure within one or more of the first and second inflatable chambers 122, 132. In some embodiments, the vent 142 is sized (e.g., is relatively large) to permit a relatively large volume of inflation gas to readily pass from the second inflatable chamber 132 into the first inflatable chamber 122 as the head of the occupant 60 is cushioned. This can aid in achieving a relatively low pressure within the second cushion portion 130 that can permit the second cushion portion 130 to "pocket." In some embodiments, such pocketing of the second cushion portion 130 may be desirable, as it may stabilize the head of the occupant and reduce rotational velocities of the head.

In some instances, differently sized occupants may interact with the airbag 110 differently when the vehicle 50 undergoes identical collision events. For example, in some instances, an occupant 60 who is larger than the occupant depicted in FIGS. 1-3 may be received almost exclusively via the first cushion portion 120. For example, the head and torso of the larger occupant 60 may be received by the first cushion portion 120. In such circumstances, the second cushion portion 130 may nevertheless assist in stabilizing the first cushion portion 120 and in preventing the occupant 60 from slipping off of the first cushion portion 120 or missing the first cushion portion 120 due to bouncing or other instability of the first cushion portion.

The airbag assembly shown in FIGS. 2 and 3, like other embodiments disclosed herein, may protect an occupant (and, in particular, the occupant's head) from contact with hard surfaces, including, for example, the instrument panel (including the center stack of an instrument panel). In other embodiments, the secondary cushion 130 may be attached to the primary cushion 120 at other positions to prevent contact with other portions of the vehicle. For example, in other or further embodiments, a second cushion portion 130 may be positioned at an outboard side of the primary cushion 120. Such a location of the secondary cushion 130 may assist in preventing harmful contact with the windshield, an A-pillar, and/or portions of a door of the vehicle, such as when the vehicle occupant is moved in an oblique direction that is both in a forward direction and an outboard direction. In other or further embodiments, one or more second cushion portions 130 may be positioned at a bottom end of the first cushion portion 120 to shield the occupant's knees. In other or further embodiments, one or more second cushion portions 130 may be positioned at a top end of the first cushion portion 120. Any suitable number and/or combination of secondary cushion portions 130 that extend from the primary cushion portion 120 are contemplated.

FIGS. 4A and 4B provide additional views of the airbag 110. FIG. 4A is an exploded perspective view of the airbag 110 in a deployed state, which illustrates a manner in which the first cushion portion 120 can be connected with the second cushion portion 130. FIG. 4B depicts airbag 110 in a non-exploded view. In the illustrated embodiment, the first cushion portion 120 includes a rear panel 121 (which may be part of a main panel), a first side panel 123, and a second side panel 124. The first side panel 123 is joined to the rear panel 121 by seam 152, and the second side panel 124 is joined to the rear panel 121 by seam 154. Seams 152 and 154 may be of any suitable variety, whether sealed or unsealed seams, and may be formed via stitching, one or more adhesives, taping, welding (e.g., radio frequency welding), heat sealing, or any other suitable technique or combination of techniques. The panels 121, 123, 124 may be formed of any suitable material. For example, in some embodiments, panels are formed of woven nylon fabric. Moreover, a variety of types and configurations of airbag panels can be utilized in various embodiments. For example, the size, shape, proportions, number, and connectivity of the panels may vary in different embodiments. Some embodiments may be tailored for use in different vehicles and/or for different locations within a vehicle.

The second cushion portion 130 may be attached to the side panel 124 of the first cushion portion in any suitable manner. In the illustrated embodiment, the second cushion portion 130 is attached via a seam 157. The size and position of the seam 157 can be such that the seam 157 is substantially circumscribed by the perimeter seam 154. Stated otherwise, the seam 157 can be spaced from the perimeter seam 154. In other embodiments, at least a portion of the second cushion portion 130 may be joined to the first cushion portion 120 via the perimeter seam 154.

As shown in FIG. 4B, a portion of the side panel 124 may separate the first inflatable chamber 122 from the second inflatable chamber 132 and thus may be referred to as a partition 140. The partition 140 can define the vent 142. In various embodiments, the partition 140 may be formed of the same material as the first cushion portion 120 and/or second cushion portion 130 and may be integrally formed with the first cushion portion 120 and/or second cushion portion 130.

In some embodiments, the partition 140 is omitted. For example, in an alternative of the illustrated embodiment, the internal vent 142 can occupy the same area as what is identified as the partition 140. Stated otherwise, the vent 140 may occupy an entirety of an interface between the first and the second cushion portions 120, 130. In some embodiments, a perimeter of the internal vent 142 is defined by the seam 157 that is used to join the first and the second cushion portions 120, 130 to each other.

The vent 142 can provide fluid communication between the first inflatable chamber 122 and the second inflatable chamber 132. Thus, during a deployment event, inflation gases may travel from the first inflatable chamber 122 through the vent 140 into the second inflatable chamber 132. In some embodiments, the airbag cushion 110 is devoid of external vents—e.g., vents that allow air to escape from an interior of the airbag cushion to the outside environment. For example, the internal vent 142 may be the only vent of the airbag cushion 110. In other embodiments, the airbag 110 may include external vents of decreased size. In some instances, a reduced size or omission of external vents can compensate for an overall increase in airbag volume.

In some embodiments, the internal vent 142 may reduce pressure within the first inflatable chamber 122 when the occupant 60 moves primarily in a forward direction so as to only engage the first cushion portion 120 by permitting inflation gases to vent into the second inflatable chamber 132. Accordingly, an amount of force exerted by the first cushion portion 120 on the occupant during ridedown may be reduced.

Certain embodiments of the airbag cushions 110 that are devoid of external vents and for which the first and second inflatable chambers 122, 132 are in fluid communication, such as previously described, can use inflation gas in an efficient manner, given that no inflation gas escapes from the airbag through external vents during inflation of the airbag cushions 110. In some instances, the lack of venting openings may reduce the potential for hot gas and/or hot particulates to be expelled from the airbag cushions 110. Similarly, inflation gas odors may be reduced.

In other or further embodiments, the airbag cushion 110 includes one or more external vents (not shown). The one or more external vents can be configured to permit the escape of inflation gases from the first inflatable chamber 122 and/or the second inflatable chamber 132. For example, in some embodiments, the one or more external vents resemble the internal vent 142, but are positioned at an exterior wall of the first and/or the second cushion portions 120, 130. In various embodiments, one or more discrete vents and/or one or more active vents may be used.

In certain embodiments, the internal vent 142 of the airbag 110 is devoid of valves. Inflation gases may thus flow freely between the first and second inflatable chambers 122, 132. In other embodiments, the internal vent 142 may include a valve (e.g., a one-way valve). For example, in some embodiments, the internal vent 142 may be configured to permit inflation gas to move from the first inflatable chamber 122 into the second inflatable chamber 132, but not in the opposite direction.

As illustrated in FIG. 4B, the second cushion portion 130 may be configured to extend a distance $D_1$ from the first cushion portion 120 when the airbag 110 is fully inflated. The distance $D_1$ may be selected based on any suitable criteria, such as a width of the first cushion portion 120, or width of the IP stack 71. Other dimensions of the second cushion portion 130 may also be selected to permit suitable coverage of potentially injurious portions of a vehicle, such as the IP stack 71 or other portions of the dashboard 70.

The deployed first cushion portion 120 can define a volume $V_1$, which is at least partially defined by the interior surfaces of the rear panel 121, the first side panel 123, and second side panel 124. The deployed second cushion portion 130 can define a volume $V_2$ that is at least partially defined by the interior surfaces of the second cushion portion 130. The first cushion portion 120 can be positioned directly in front of an occupant position within a vehicle, as previously stated, and may be configured to be expanded prior to expansion of the second cushion portion 130. In the illustrated embodiment, the first and second cushion portions 120, 130 may be configured to fill simultaneously, although one may fill more rapidly than the other. In many embodiments, the volume $V_1$ is greater than the volume $V_2$.

Figure 5B:
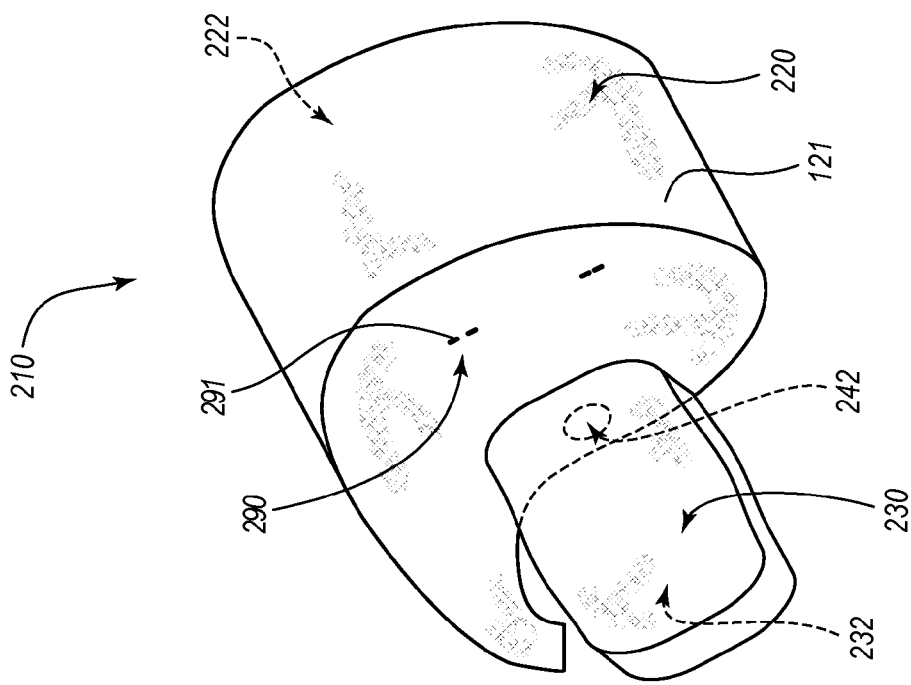
FIG. 5B is a perspective view of the airbag of FIG. 5A in which both the first cushion portion and the second cushion portion are inflated, wherein the temporary fastener is shown as having released the second cushion portion.
Figure 5A:
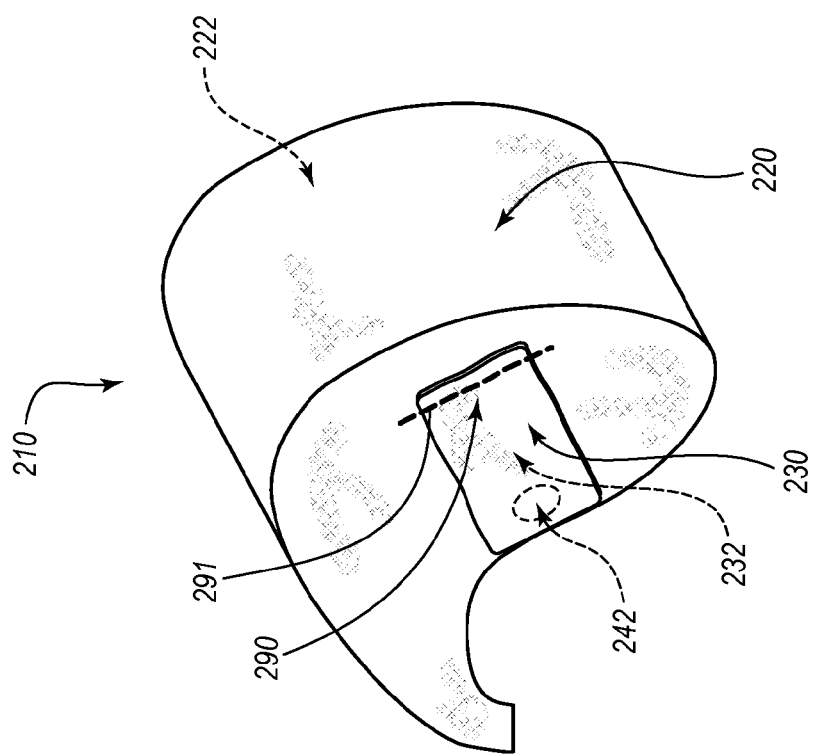
FIG. 5A is a perspective view of another embodiment of an airbag that includes a first cushion portion attached to a second cushion portion, wherein the first cushion portion is shown in an inflated state and the second cushion portion is in a non-inflated state, and wherein a temporary fastener assists in maintaining the second cushion portion in the non-inflated state.

FIGS. 5A and 5B depict another embodiment of an airbag 210 that can resemble the airbag 110 described above in certain respects. Accordingly, like features are designated with like reference numerals, with the leading digits incremented to "2." Relevant disclosure set forth above regarding similarly identified features thus may not be repeated hereafter. Moreover, specific features of the airbag 200 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag assembly 200. Any suitable combination of the features and variations of the same described with respect to the airbag 110 can be employed with the airbag 210, and vice versa. Similarly, the airbag 210 can be used with any suitable airbag assembly, including the airbag assembly 100 discussed above. This pattern of disclosure applies equally to further embodiments depicted in subsequent figures and described hereafter, wherein the leading digits may be further incremented.

FIGS. 5A and 5B are perspective views of an airbag 210 in different stages of deployment. The airbag 210 includes a first cushion portion 220, a second cushion portion 230, and a temporary fastener 290. The temporary fastener 290 is configured to maintain the second cushion portion 230 in a compact state during expansion of the first cushion portion 220 from a compact state. In other embodiments, the temporary fastener 290 is configured to maintain a second cushion portion 230 in the compact state during only an initial portion of expansion of a first cushion portion 220 (e.g., the second cushion portion 230 can begin to inflate prior to full deployment of the first cushion portion 220). A strength of the temporary fastener 290 can be selected to achieve the desired deployment characteristics of the airbag 210. In various embodiments, the temporary fastener 290 can comprise one or more of stitching (e.g., one or more break stitches or tack stitches), adhesive, hook-and-pile fasteners, and/or other suitable fasteners. In the illustrated embodiment, the fastener 290 comprises a break stitch 291.

The temporary fastener 290 can be configured to release the second cushion portion 230 to permit expansion of the second cushion portion 230 at a desired stage of deployment. For example, the temporary fastener 290 can be configured to release the second cushion portion 230 when a threshold pressure is reached at an interior of the airbag 210. In other or further embodiments, the temporary fastener 290 is used to achieve a desired deployment pattern for the airbag 210. In still other or further embodiments, the temporary fastener 290 is used to assist with packaging of the airbag 210, such as by retaining the second cushion portion 230 in a suitable position for folding or rolling. In some embodiments, the temporary fastener 290 can be used to provide a desired deployment trajectory for the second cushion portion 230.

FIGS. 5A and 5B depict temporally distinct stages of a deployment event. FIG. 5A depicts an early stage of airbag inflation in which inflation gas has filled (or has substantially filled) a first inflatable chamber 222, but not a second inflatable chamber 232. FIG. 5B illustrates a later stage in which the first cushion chamber 222 has been completely filled with inflation gas and the second chamber 232 has also been filled with inflation gas. The airbag 210 can include a vent 242 such as the vent 142 discussed above. The illustrated vent 242 is positioned between the first cushion portion 220 and the second cushion portion 230 to direct inflation gas into the second cushion portion 230. In certain embodiments, the vent 242 may be a discrete vent that is continuously in an open state to provide continuous fluid communication between the first and second chambers 222, 232.

In the partially deployed state of the airbag 210 shown in FIG. 5A, the first cushion portion 220 has been deployed to a substantially filled state while the temporary fastener 290 secures the second cushion portion 230 to the first cushion portion 220, thereby preventing inflation of the second cushion portion 230. This securement mechanism causes the second cushion portion 230 to remain uninflated while the first cushion portion 220 begins to inflate or becomes substantially inflated. In the fully deployed state of the airbag 210 depicted in FIG. 5B, the temporary fastener 290 is shown as having released the second cushion portion 230 from the first cushion portion 220, thus allowing the second cushion portion 230 to inflate.

Deployment of the airbag 210 can proceed by first directing inflation gas from an inflator into the first cushion portion 220 to expand or substantially inflate the first cushion portion 220. The vent 242 between the first cushion portion 220 and the second cushion portion 230 can direct inflation gas into the second cushion portion 230. In some embodiments, the temporary fastener 290 maintains the second cushion portion 230 in the unexpanded state until a desired, predetermined, or threshold pressure within the airbag cushion 210 has been reached. For example, inflation gas may first be directed into a first cushion portion 220 to substantially inflate the first cushion portion 220. When internal pressure within the airbag 210 is sufficient to cause the temporary fastener 290 to release the second cushion portion 230, inflation gas from within the first inflatable chamber 222 can pass through the vent 242, either initially or in addition to inflation gas that may have already passed through the vent 242, to inflate the second cushion portion 230.

In the view of the foregoing, the first cushion portion 220 may deploy more rapidly than the second cushion portion 230. Stated otherwise, in some embodiments, the first cushion portion 220 is deployed prior to the second cushion portion 230. Sequential filling of compartments of the airbag 210 may be advantageous in some circumstances. For example, in some instances, a collision event can cause the vehicle occupant to move primarily or substantially completely in the forward direction. In such instances, the first cushion portion 220 can adequately receive the vehicle occupant and prevent, inhibit, or reduce harmful contact with portions of the vehicle, such as the dashboard.

It may be desirable for the first cushion portion 220 to fill relatively rapidly given the relatively close proximity of the vehicle occupant 60 to the airbag 210. In particular, the occupant 60 may travel along a path that is shorter than any oblique path the occupant 60 may travel. The shortness of the path may be due in part to a larger size of the first cushion portion 220, as compared with the second cushion portion 230 and/or may be due to the more direct route traveled by the occupant 60. Thus the timing of the occupant's arrival at the first cushion portion 220 of the airbag 210 may be relatively sooner than the arrival time of the occupant at the second cushion portion 230. Further, in some arrangements, it may be desirable for the first cushion portion 220 to be substantially filled with inflation gases when the first cushion portion 220 receives the vehicle occupant, while it may be desirable for the second cushion portion 230 to be unfilled or only partially filled with inflation gases. Such an arrangement can more readily permit venting of inflation gases into the second cushion portion 230 as the occupant rides down in the first cushion portion 220. In some embodiments, the deployment timing of the airbag cushion 210 may be such that the temporary fastener 290 remains engaged with the second cushion portion 230 during impact of the occupant with the first cushion portion 220, and the increased pressure within the airbag cushion 210 due to ridedown of the occupant in the first cushion portion 220 causes the fastener 290 to release the second cushion portion 230 for venting into the second cushion portion 230. Some embodiments of airbags 210 that are devoid of external vents may advantageously be configured for such a deployment and ridedown scenario.

In some instances, a collision event can cause the vehicle occupant to move at an oblique angle relative to the forward direction, such as with a component of momentum that extends toward an inboard or central region of the vehicle. The vehicle occupant may take longer to arrive at the second cushion portion 230 due to the longer path the occupant travels and/or due to a smaller size of the second cushion portion 230. In view of the foregoing, in some embodiments, the first cushion portion 220 may be prepared to receive a vehicle occupant who is seated directly in front of the first cushion portion 220 when the vehicle occupant moves in a forward direction before the second portion 230 is prepared to receive the vehicle occupant when the vehicle occupant moves in a direction that is oblique relative to the forward direction. In some embodiments, the timing for inflation of the first and second cushion portions 220, 230 can be adjusted by altering the relative sizes of the first and second cushion portions 220, 230 and/or by adjusting a strength of the temporary fastener 290 (or stated otherwise, by adjusting a threshold pressure at which the second cushion portion 230 can inflate). In other or further embodiments, the relative timing of inflation of the first and second cushion portions 220, 230 can be adjusted by altering one or more of the size, quantity, location, and number of internal vents 242.

FIGS. 6-10B depict another embodiment of an airbag assembly 300 that resembles the airbag assembly 100 discussed above in many respects. The airbag assembly 300 includes an airbag 310 that can resemble the airbags 110, 210 in many respects.

Figure 6:
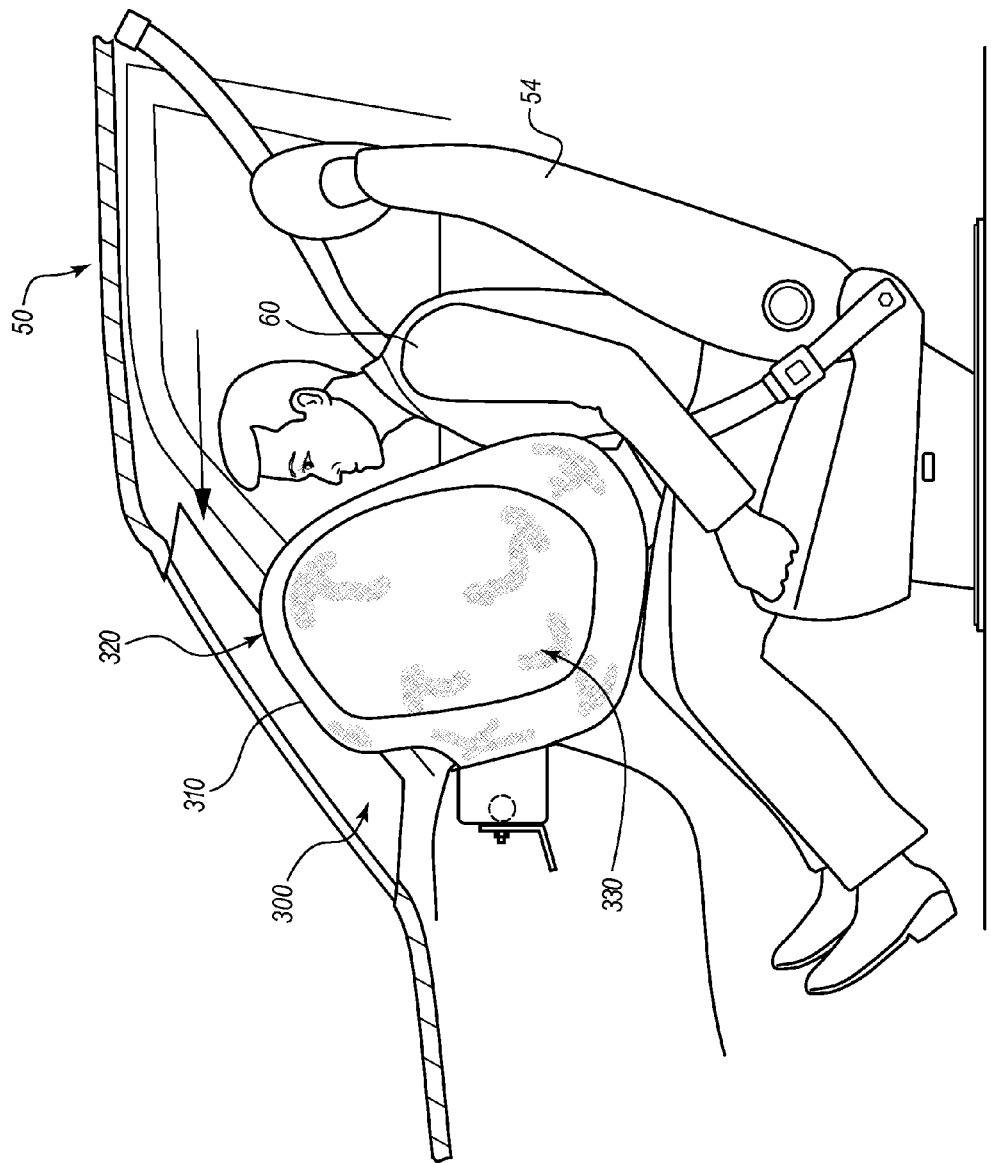
FIG. 6 is a side elevation view of another embodiment of an airbag assembly in a deployed state within a vehicle, wherein an occupant seated in a front passenger seat of the vehicle is depicted moving toward the deployed airbag assembly.

In particular, FIG. 6 is a side elevation view of the airbag assembly 300 in a deployed state within the vehicle 50. The vehicle occupant 60 seated in the front passenger seat 54 of the vehicle is depicted moving in a primarily forward direction toward the deployed airbag 310 portion of the assembly. The airbag 310 includes a first cushion portion 320 and a second cushion portion 330. In the illustrated embodiment, the first cushion portion 320 generally resembles the illustrated configurations of the first cushion portions 120, 220 discussed above. However, the second cushion portion 330 is sized and shaped differently from the second cushion portions 130, 230, as discussed further below. In the elevation view of FIG. 6, it can be seen that the second cushion portion 330 can be relatively larger than the second cushion portions 130, 230. The shape, geometry, orientation, location, and/or any other suitable feature or configuration of the second cushion portion 330 may be adjusted for a desired operation within a given vehicle. Moreover, the configuration of the second cushion portion 330 may be altered from one vehicle arrangement to another for desired performance characteristics. For example, vehicle arrangements in which vehicle geometries, instrument panel arrangements, windshield configurations, etc. differ from one to another may result in different configurations of the first and/or the second cushion portions 120, 130. The instrument panels and windshields can provide different reaction surfaces for the cushion portions 120, 130.

Figure 7:
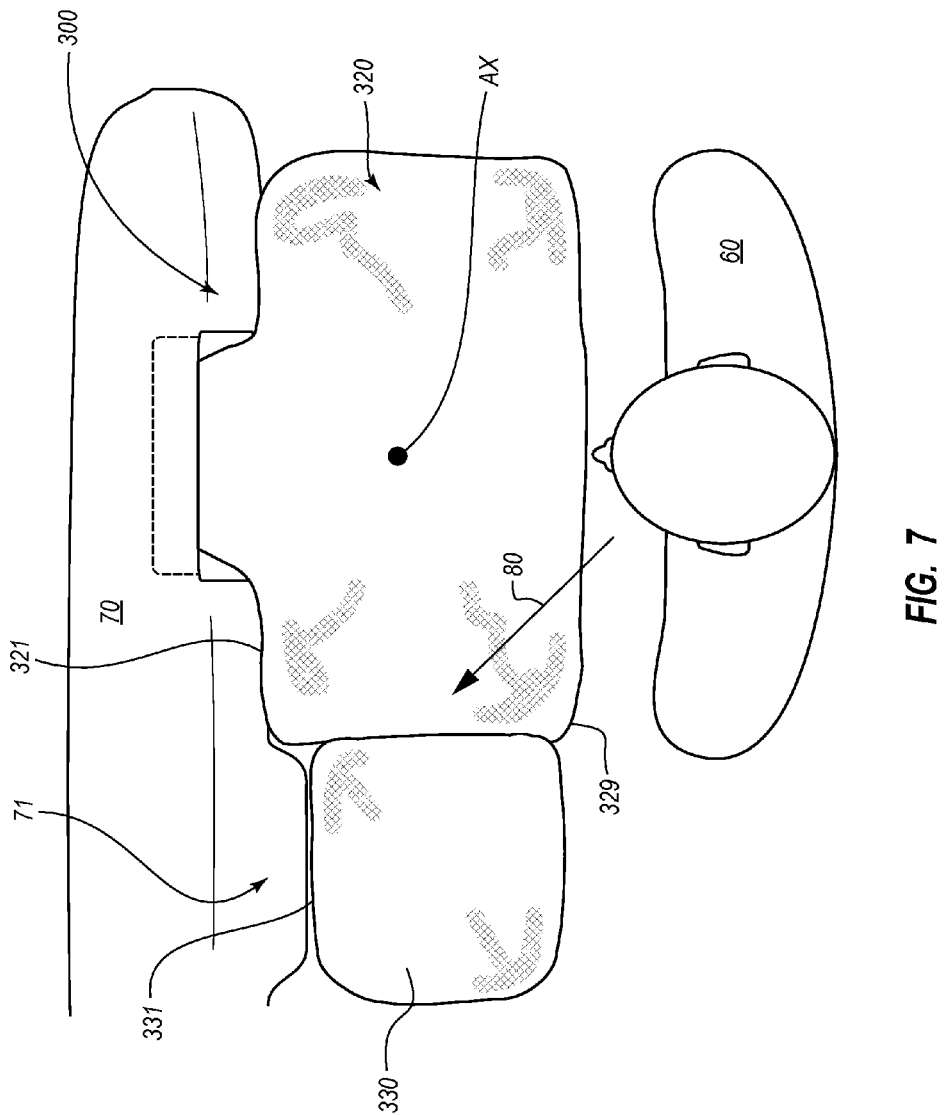
FIG. 7 is a top plan view of the airbag assembly of FIG. 6 deployed in a different collision event, wherein the vehicle occupant is depicted moving in a different direction relative to the airbag assembly.

FIG. 7 is a top plan view of the airbag assembly 300 deployed in collision event different from that depicted in FIG. 6. In particular, the vehicle occupant 60 moves in an oblique direction 80 relative to the airbag assembly 300 as a result of the illustrated collision event. In this view, it can be seen that the vehicle has a different dashboard 70 arrangement than that depicted in FIG. 2. In particular, an IP stack 71 portion of the dashboard 70 projects rearwardly from adjacent portions of the dashboard, which is a common feature in various vehicles. As shown in FIG. 7, the second cushion portion 330 includes a front face 331 that is positioned rearwardly relative to a front face 321 of the first cushion portion 320. The cushion 310 may thus be configured to closely conform to a rearward face of the dashboard 70. In certain embodiments, such an arrangement can permit the second cushion portion 330 to stabilize the first cushion portion 320, such as by preventing the first cushion portion 320 from rotating about a central axis AX (i.e., an axis directed into and out of the page in FIG. 7) as the occupant 60 moves against and/or past an inboard corner 329 of the first cushion portion 320. Such stabilization may assist the first cushion portion 320 in restraining the occupant 60.

Figure 8:
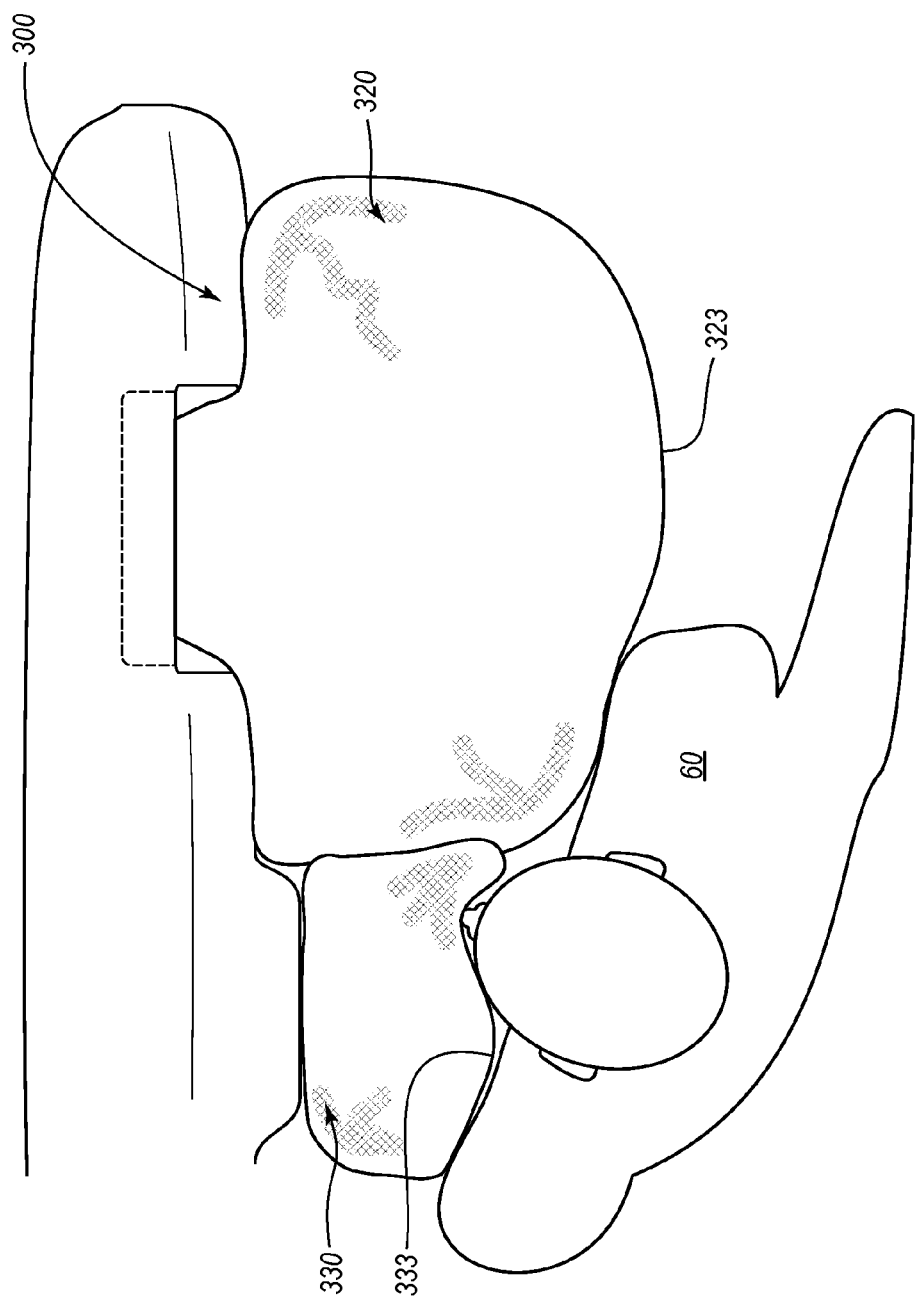
FIG. 8 is a top plan view of the airbag assembly of FIG. 6 that depicts a subsequent position of the vehicle occupant, as compared to FIG. 7, wherein a multi-chambered airbag cushions the vehicle occupant.

FIG. 8 is a top plan view of the airbag assembly 300 that depicts a subsequent position of the vehicle occupant 60, as compared to FIG. 7. As shown, the second cushion portion 330 also may directly restrain at least a portion of the vehicle occupant 60 as the occupant continues to move in the oblique direction. In some embodiments, a rear face 333 of the second cushion portion 330 may be positioned forward of a rear face 323 of the first cushion portion 320. Such a configuration may permit the occupant 60 to first contact the first cushion portion 320 and be rotated thereby, and to then contact the second cushion portion 330 and be received thereby in a direction that is more forward than the oblique direction 80 shown in FIG. 7.

Figure 9:
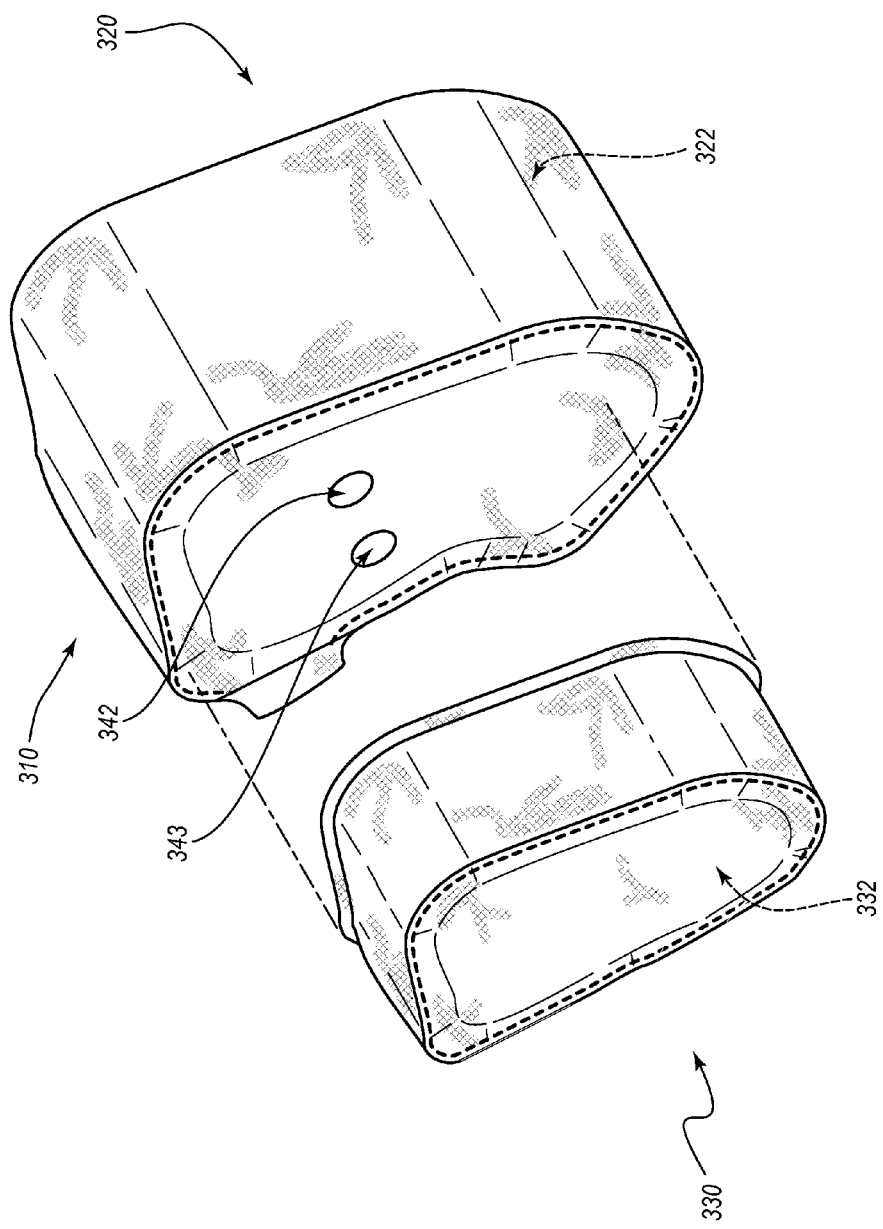
FIG. 9 is an exploded perspective view of an airbag portion of the airbag assembly of FIG. 6 that is shown in an expanded state, wherein a pair of vents that provide fluid communication between a pair of inflatable chambers is shown.

FIG. 9 is an exploded perspective view of the airbag 310 that is shown in an expanded state. The airbag 310 includes a pair of vents 342, 343, which may resemble the vents 142, 242 and can provide fluid communication between the inflatable chambers 322, 332.

Figure 10A:
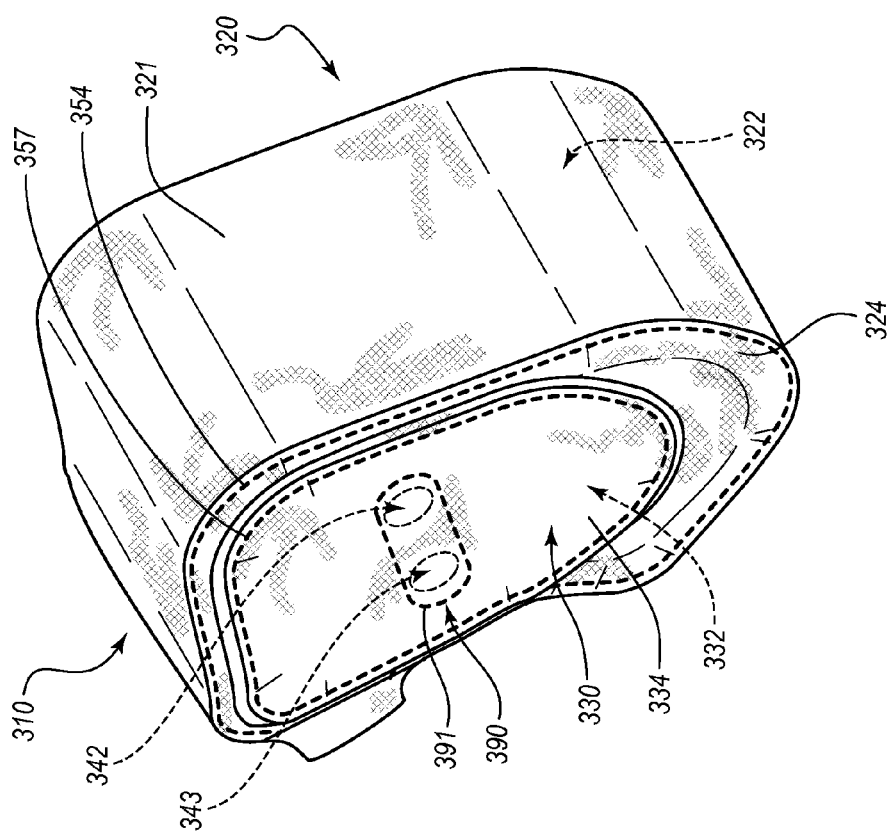
FIG. 10A is a perspective view of the airbag of FIG. 9 in an assembled state, wherein the airbag includes a first cushion portion attached to a second cushion portion, wherein the first cushion portion is shown in an inflated state and the second cushion portion is in a non-inflated state, and wherein a temporary fastener assists in maintaining the second cushion portion in the non-inflated state.

FIG. 10A is a perspective view of the airbag 310 in an assembled state. In the illustrated embodiment, the second cushion portion 330 is at an exterior of the first cushion portion 320, and an inboard panel 334 of the second cushion portion 330 is maintained in close proximity to an inboard panel 324 of the first cushion portion 320. The airbag 310 includes a temporary fastener 390 that can assist in maintaining the second cushion portion 330 in the non-inflated state until a desired condition (e.g., pressure level within the airbag 310) is met. In other embodiments, the temporary fastener 390 may be omitted. The temporary fastener 390 may comprise a break stitch 391 that differs somewhat from the break stitch 191. For example, in the illustrated embodiment, the break stitch 391 encompasses both vents 342, 343. In some embodiments, the break stitch 391 may be positioned internally within the chamber 332 of the second cushion portion 330. In the illustrated embodiment, the break stitch 391 extends through the inboard panel 334 of the second cushion portion 330 and through the inboard panel 324 of the first cushion portion 320.

In the illustrated embodiment, the second cushion portion 330 is attached to the first cushion portion 320 via a seam 357. The seam 357 may be positioned at an interior of a perimeter seam 354 that is used to join the side panel 324 with a main panel 321 of the first cushion portion 330. In other embodiments, at least a portion of the second cushion portion 330 can be attached to the first cushion portion 320 via at least a portion of the perimeter seam 354.

Figure 10B:
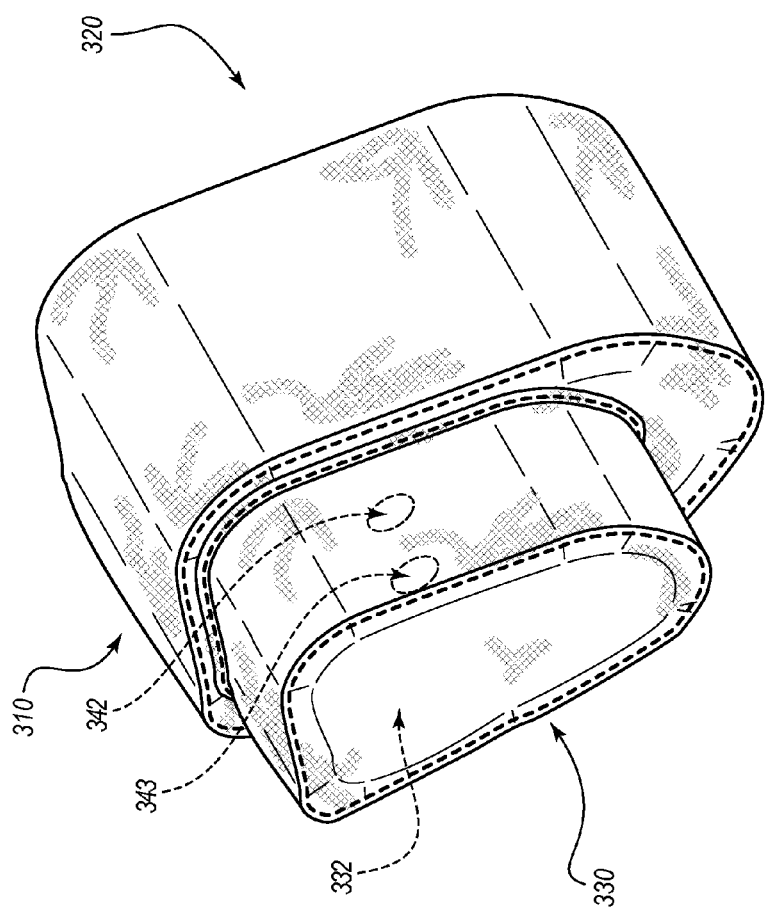
FIG. 10B is a perspective view of the airbag of FIG. 10A in which both the first cushion portion and the second cushion portion are inflated, wherein the temporary fastener is shown as having released the second cushion portion.

FIG. 10B is a perspective view of the airbag 310 in which both the first cushion portion 320 and the second cushion portion 330 are inflated. The temporary fastener 390 (see FIG. 10A) is shown as having released the second cushion portion 330, such that the second inflatable chamber 332 has expanded the second cushion portion 330.

In other embodiments, the internal vents 342, 343 may initially be in a closed state. For example, the vents 342, 343 may each be closed by a flap (not shown) that is held closed via any suitable temporary fastener, such as a break stitch. The temporary fastener may release the flap to open the associated vent 342, 343 when a threshold pressure within the first inflatable chamber 322 is reached. In various embodiments, such initially-closed vents 342, 343 may be used in addition to or instead of the temporary fastener 390.

As shown in FIGS. 6, 9, 10A, and 10B, in the illustrated embodiment, the second cushion portion 330 is positioned at a top end of the first cushion portion 320. In other or further embodiments, the second cushion portion 330 may be more centrally located and/or may be positioned at a lower end of the first cushion portion 320. In some embodiments, the second cushion portion 330 may extend outwardly beyond a perimeter of the first cushion portion 320 in one or more directions. For example, in various embodiments, the first cushion portion 320 extends longitudinally and/or vertically beyond the perimeter of the first cushion portion 320. The terms "longitudinally" and "vertically" are used relative to the vehicle. Accordingly, the term "longitudinally" can include a forward direction (e.g., toward a front end of the vehicle) and/or a rearward direction (e.g., toward a back end of the vehicle). The term "vertically" can include an upward direction (e.g., toward a roof of the vehicle) and/or a downward direction (e.g., toward a floor of the vehicle). In some arrangements, the second cushion portion 330 extends laterally (e.g., in an outboard direction) in front of the first cushion portion 330. The second cushion portion 330 can extend toward the vehicle occupant, in some arrangements. The various possible locations and configurations of the second cushion portion 330 may be selected according to the desired support and/or positioning of the second cushion portion 330 for receipt of the head of the vehicle occupant 60.

Figure 11:
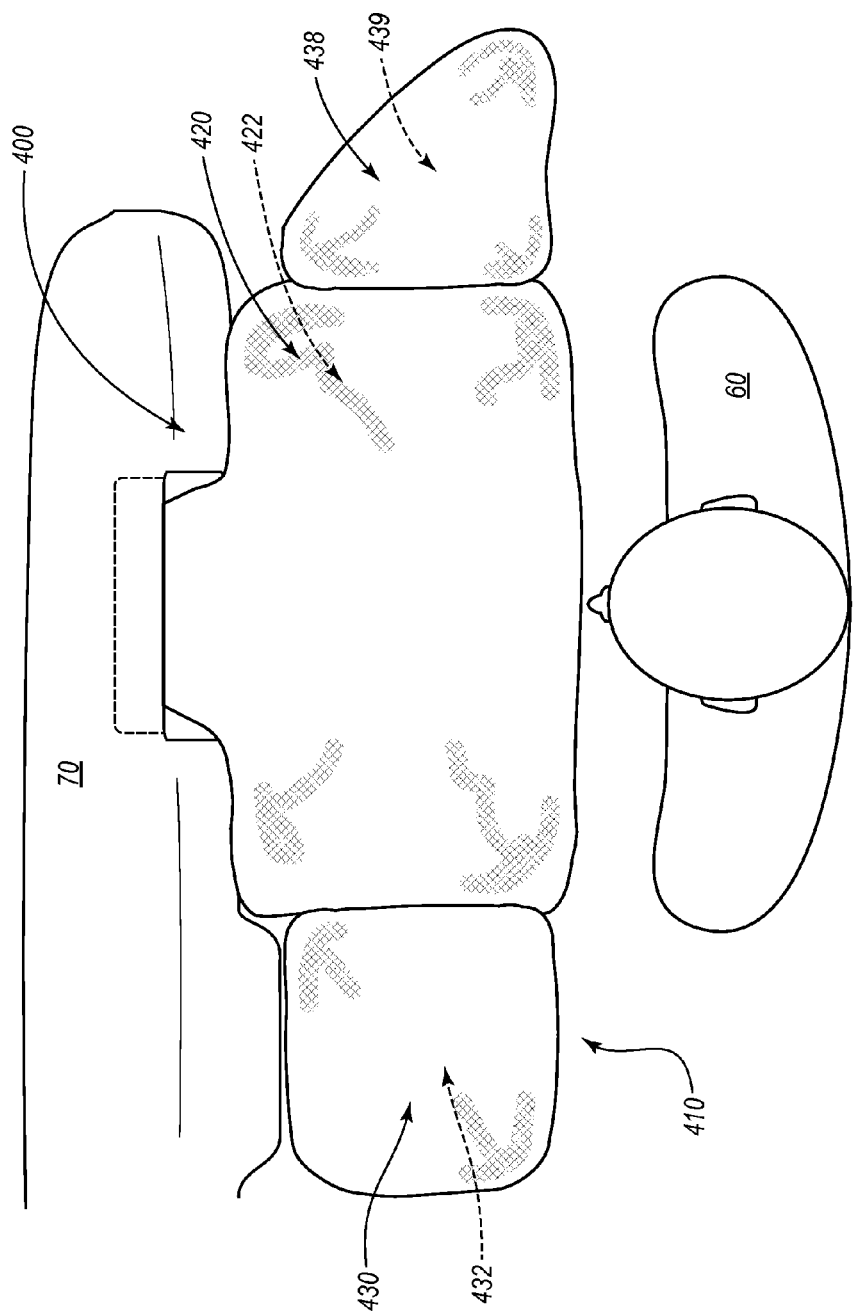
FIG. 11 is a top plan view of another embodiment of an airbag assembly in a deployed state within a vehicle.

FIG. 11 illustrates another embodiment of an airbag assembly 400 that is installed within the dashboard 70 of a vehicle. The airbag assembly 400 includes an airbag cushion 410 that can include a primary cushion portion 420 that defines a primary chamber 422 and a supplemental cushion portion 430 that defines a supplemental chamber 432. These features can resemble the similarly numbered features discussed above. In other embodiments, the supplemental cushion portion 430 is omitted.

The airbag cushion 410 further includes a supplemental cushion portion 438 that extends in an outboard direction from the primary cushion portion 420. The supplemental cushion portion 438 can define a supplemental chamber 439 that is in fluid communication with the primary chamber 422 in manners such as discussed above, such as via one or more internal discrete vents. The supplemental cushion portion 438 can be configured to prevent harmful contact between the vehicle occupant 60 and rigid portions of the vehicle that are at an outboard side of the primary cushion portion 420, such as an A-pillar, a door, etc. In some instances, the supplemental cushion portion 438 is particularly well suited to protect the occupant 60 when the occupant moves in an oblique direction that includes a component that is outwardly directed (or directed in an outboard direction), as compared with the forward direction.

As previously discussed, other positions for supplemental cushion portions, such as the supplemental cushion portion 438 are also contemplated. For example, in some embodiments, one or more supplemental cushion portions may extend upwardly and/or downwardly from the primary cushion portion 420. Moreover, in various embodiments, any of the supplemental cushion portions, such as the supplemental cushion portion 438, can include any of the variations discussed with respect to the supplemental cushion portions 130, 230, 330, as desired based on performance characteristics.

In some embodiments, the airbags 110, 210, 310, 410 can allow for narrower primary cushion portions 120, 220, 320, 410 and can further reduce an amount of inflation gas used, as compared with airbags that do not have a supplemental cushion portion. The supplemental cushion portions 130, 230, 330, 410 can provide for localized coverage of various portions of the vehicle 50 to cushion the vehicle occupant 60.

Figure 12:
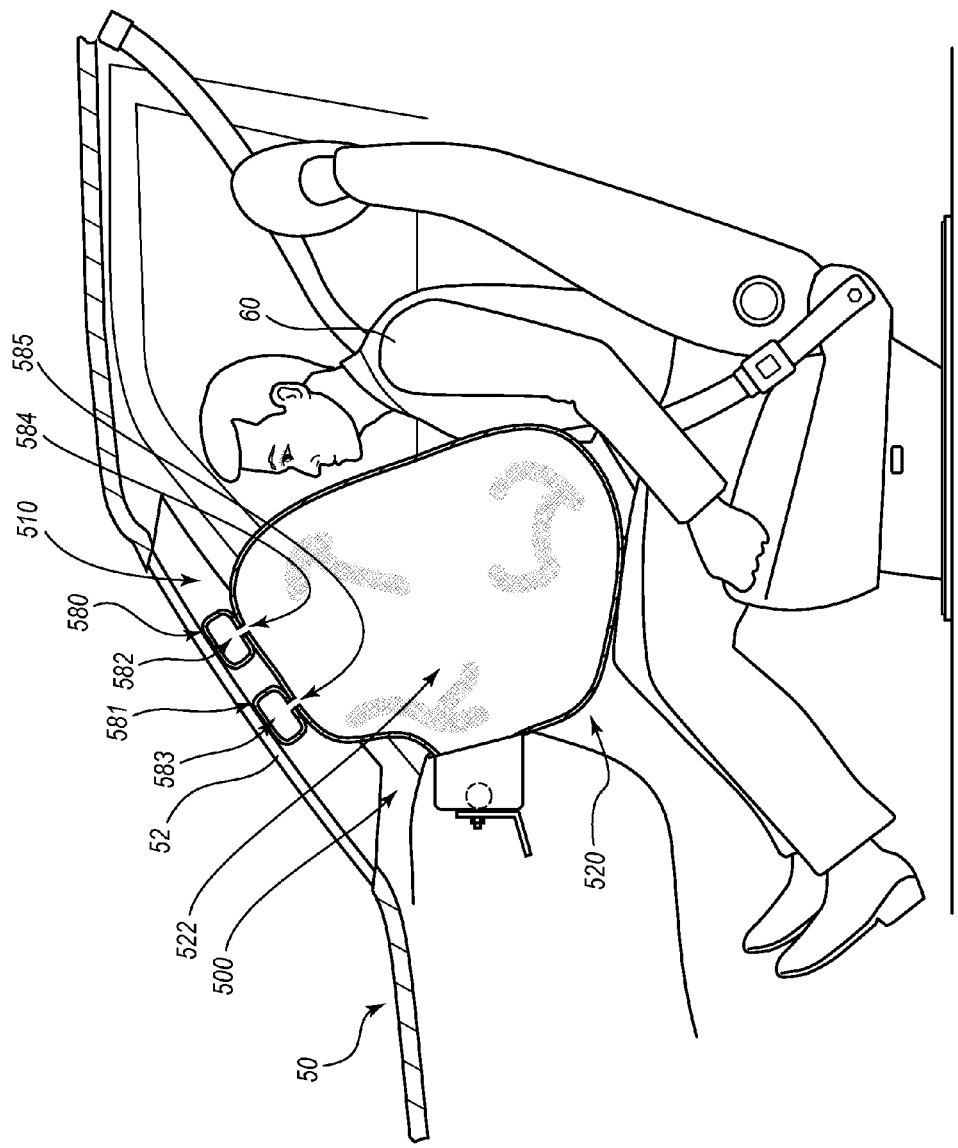
FIG. 12 is a cross-sectional view of a portion of another embodiment of an airbag assembly deployed within a vehicle.

FIG. 12 is a cross-sectional view of a deployed airbag assembly 500. The airbag assembly 500 includes an airbag 510. The airbag 510 includes a first or primary cushion portion 520 and one or more supplemental cushion portions 580, 581. The primary cushion portion 520 can define a primary inflatable chamber 522, and each supplemental cushion portion 580, 581 can define a supplemental inflatable chamber 582, 583, respectively. The primary inflatable chamber 522 can be in fluid communication with each of the supplemental inflatable chambers 582, 583 via one or more internal vents 584, 585, respectively. In some embodiments, such as that illustrated in FIG. 11, the vents 584, 585 may be discrete or continuously open vents and may permit inflation gas to flow freely there through in either direction.

The primary cushion portion 520, when deployed, can be configured to receive an occupant 60 seated directly in front of the first cushion portion 520. The one or more supplemental cushion portions 580, 581 can be connected to the first cushion portion 520 in any suitable manner, such as via one or more seams. In some embodiments, the one or more supplemental cushion portions 580, 581 are integrated into seams that join a main panel and two side panels of the first cushion portion 520. When deployed, the first and second supplemental cushion portions 580, 581 are configured to contact a windshield 52 of the vehicle 50, which can stabilize and/or position the airbag 510 for receiving the occupant 60 in a collision event. Such an arrangement can reduce an amount of an airbag that is in contact with the windshield 52 while maintaining a stable base for the airbag against the windshield. Accordingly, a volume of the airbag can be reduced along the region adjacent to the windshield, as a smaller portion of the airbag is in contact with the windshield. One or more of the cushion portions 580, 581 and/or additional cushion portions may be different sizes and/or shapes to account for windshield sweep or curvature and/or to provide a greater or lesser interaction with the windshield. In other or further embodiments, one or more of the supplemental chambers may interact with other rigid portions of the vehicle interior, whether instead of or in addition to interaction with the windshield.

When the airbag assembly 500 is deployed, inflation gas enters the primary inflatable chamber 522 and travels into the supplemental inflatable chambers 582, 583. The inflation process causes the inflated supplemental cushion portions 580, 581 to contact the windshield 52. Contact with a rigid surface, such as windshield 52 can stabilize the airbag 510 and ensure that the airbag 510 is properly positioned to receive the occupant 60 during the collision event. Such a configuration may decrease the volume of inflation gas that must be released by an inflator to properly inflate an airbag 510 (e.g., an overall volume of the airbag 510 can be decreased, relative to other arrangements). The airbag 510 may be deployed more rapidly due to its decreased volume.

In some embodiments, the small size of the supplemental inflatable chambers 582, 583 and/or their positioning at and inflation against the windshield 52 can cause the primary cushion portion 520 to have a downward trajectory during inflation. Stated otherwise, the supplemental cushion portions 580, 581 may cause the airbag 510 to react off of the windshield 510. The downward inflation trajectory can result in the occupant 60 encountering the airbag with neck flexion, rather than neck extension. The tendency to encounter the airbag with the neck flexed may result in a decrease in the number and/or magnitude of neck injuries resulting from collision events. In some embodiments, the stabilized primary cushion 520 may be less prone to rolling and/or missing the occupant 60 when the occupant travels in an oblique direction (e.g., the oblique direction 80) in other collision events that cause such movement.

The illustrated embodiment depicts an airbag 510 with two supplemental cushion portions 580, 581. However, other embodiments may have any number of supplemental portions (e.g., one, two, three, four, or five supplemental portions). In some embodiments, supplemental portions configured to contact the windshield may be used in conjunction with cushion portions that extend laterally from the first cushion portion, such as those described above with respect to the airbags 110, 210, 310. In some embodiments, the supplemental cushion portions 581, 582 do not contact the windshield, but nonetheless are configured to contact some other hard surface within the vehicle when deployed.

In the illustrated embodiment, the supplemental cushion portions 580, 581 are oriented substantially horizontally. In other or further embodiments, one or more of the supplemental cushion portions 580, 581 and/or one or more additional supplemental cushion portions may be oriented vertically or in any other suitable orientation to provide a desired reaction surface for the airbag cushion 510. The supplemental cushion portions 580, 581 can space the primary cushion portion 520 from the windshield 52 and act as a stabilizing base.

Any suitable combination of the features of the airbags 110, 210, 310, 410, 510 is contemplated. Other features and arrangements are also contemplated. For example, in various embodiments, an airbag 110, 210, 310, 410, 510 can include one or more external vent holes, tethers, non-inflated areas, etc. Such features may be incorporated into one or more of the supplemental cushion portions 130, 230, 330, 430, 438, 580, 581.

Much of the foregoing disclosure has focused on passenger airbags. It should be understood that airbag features disclosed herein may be used with other types of airbags, as previously mentioned. For example, in some embodiments, driver airbags can include primary and secondary chambers such as disclosed herein.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
 a bucket seat configured to provide a vehicle occupant position for a single occupant;
 a housing configured to be mounted in a dashboard of a vehicle at a first position;
 an inflator; and
 an airbag cushion that comprises:
  a first cushion portion that defines a first inflatable chamber that is configured to receive inflation gas from the inflator to expand the first cushion portion from a compact state to a deployed state, wherein the first cushion portion is configured to deploy from the housing when the housing is mounted in the dashboard of the vehicle at the first position, and wherein the first cushion portion is configured to receive a torso of the vehicle occupant when the vehicle occupant moves from the vehicle occupant position provided by the bucket seat primarily in a forward direction relative to the vehicle;
  a second cushion portion connected to the first cushion portion, wherein the second cushion portion defines a second inflatable chamber that is configured to receive inflation gas from the first inflatable chamber to expand the second cushion portion from a compact state to a deployed state to cover a second portion of the dashboard that is closer to a center of a vehicle than is the first portion of the dashboard; and
  at least one discrete vent that is internal to the airbag cushion and provides fluid communication between the first and the second inflatable chambers to permit inflation gas to flow freely from the first inflatable chamber to the second inflatable chamber and to permit inflation gas to flow freely from the second inflatable chamber to the first inflatable chamber;
 wherein the first cushion portion is configured to deploy from the housing primarily in a first direction toward the vehicle occupant position, and wherein the second cushion portion is configured to expand away from the first cushion portion in primarily a second direction that is lateral to the first direction;

wherein a rearward-most surface of the first cushion portion is disposed rearward of a rearward-most surface of the second cushion portion when the airbag cushion is fully inflated; and wherein the second cushion portion is configured to receive a head of the vehicle occupant when the vehicle occupant moves from the vehicle occupant position provided by the bucket seat in a direction that is oblique relative to the forward direction and includes a component in the second direction.

2. The airbag assembly of claim 1, wherein the at least one discrete vent is positioned directly between the first and the second inflatable chambers to provide direct fluid communication between the first and the second inflatable chambers.

3. The airbag of claim 1, wherein the first cushion portion is configured to deploy earlier than the second cushion portion such that the first cushion portion is prepared to receive a vehicle occupant seated directly in front of the first cushion portion when the vehicle occupant moves in a forward direction earlier than the second portion is prepared to receive the vehicle occupant when the vehicle occupant moves in a direction that is oblique relative to the forward direction.

4. The airbag of claim 1, further comprising a temporary fastener that is configured to maintain the second cushion portion in a compact state during at least a portion of an expansion of the first cushion portion from the compact state to the deployed state.

5. The airbag of claim 4, wherein the temporary fastener comprises a break stitch.

6. The airbag of claim 4, wherein the temporary fastener comprises one or more break stitches that encompass the at least one discrete vent.

7. The airbag of claim 6, wherein the at least one discrete vent comprises two discrete vents.

8. The airbag of claim 1, wherein a partition comprises the at least one discrete vent and separates the first and second inflatable chambers from each other.

9. The airbag of claim 8, wherein a unitary piece of material defines both the partition and a portion of the first cushion portion that extends outwardly beyond a perimeter of the second cushion portion.

10. The airbag of claim 1, wherein a single discrete vent provides fluid communication between the first and the second inflatable chambers, and wherein a perimeter of the vent is defined by a seam that connects the first and the second cushion portions to each other.

11. The airbag of claim 1, wherein the first and second cushion portions are devoid of external vent openings, and wherein the second inflatable chamber is configured to receive inflation gas from the first inflatable chamber via the at least one discrete vent that is internal to the airbag cushion as a vehicle occupant is cushioned by the first cushion portion.

12. The airbag of claim 1, wherein the second cushion portion is connected to the first cushion portion via stitching.

13. The airbag of claim 12, wherein a periphery of the second cushion portion is smaller than a periphery of the first cushion portion, where wherein the periphery of the second cushion portion is secured to a sidewall of the first cushion portion via the stitching at a position internal to the periphery of the first cushion portion.

14. The airbag of claim 12, wherein at least a portion of the first and second cushion portions are connected via a common seam.

* * * * *